(12) United States Patent
Masu

(10) Patent No.: US 10,745,041 B2
(45) Date of Patent: Aug. 18, 2020

(54) STEERING DEVICE

(71) Applicant: HONDA MOTOR CO., LTD., Minato-ku, Tokyo (JP)

(72) Inventor: Shintaro Masu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 66 days.

(21) Appl. No.: 16/102,885

(22) Filed: Aug. 14, 2018

(65) Prior Publication Data

US 2019/0106140 A1 Apr. 11, 2019

(30) Foreign Application Priority Data

Oct. 5, 2017 (JP) .................................. 2017-195198

(51) Int. Cl.
*B62D 1/12* (2006.01)
*B60N 2/75* (2018.01)

(52) U.S. Cl.
CPC ...... *B62D 1/12* (2013.01); *B60N 2/79* (2018.02)

(58) Field of Classification Search
CPC . B62D 1/12; B62D 1/14; B60N 2/753; B60N 2/79; B60N 2/005; B60N 2/02; B60N 2/0252; B60N 2/18; B60N 2/22; G05G 1/62
USPC ........................................................ 280/778
See application file for complete search history.

(56) References Cited

U.S. PATENT DOCUMENTS

| 2,618,447 | A | * | 11/1952 | Lecarme | ................. | B64C 13/00 |
| | | | | | | 244/231 |
| 4,478,308 | A | * | 10/1984 | Klaassen | ................ | B60K 26/00 |
| | | | | | | 180/326 |
| 8,100,218 | B2 | * | 1/2012 | Case | ........................ | B62D 1/12 |
| | | | | | | 180/315 |
| 2004/0129486 | A1 | * | 7/2004 | Chernoff | ................... | B60T 7/08 |
| | | | | | | 180/315 |

(Continued)

FOREIGN PATENT DOCUMENTS

| JP | 64-070809 | 3/1989 |
| JP | 08-034353 | 2/1996 |

(Continued)

OTHER PUBLICATIONS

Machine Translation of JP2004224238 (Year: 2004).*

(Continued)

*Primary Examiner* — Paul N Dickson
*Assistant Examiner* — Kurtis Nielson
(74) *Attorney, Agent, or Firm* — Amin, Turocy & Watson, LLP

(57) ABSTRACT

The present invention provides a steering device that includes: a pair of armrests which are mounted on left and right sides of a seat for a vehicle and are formed to be movable in a forward and backward direction of the seat, and on which arms of a driver are placed; and a pair of steering members which are provided on the pair of armrests, are formed to be grasped by the driver in a state in which the arms of the driver are placed on the pair of armrests, and are moved in the forward and backward direction to change a steering angle of the vehicle. The armrests are configured to move in the forward and backward direction in association with the movement of the steering members in the forward and backward direction.

9 Claims, 11 Drawing Sheets

(56) References Cited

U.S. PATENT DOCUMENTS

2004/0133322 A1* 7/2004 Chernoff ............... B60K 26/02
                                                        701/41
2011/0025108 A1   2/2011 Wihinen
2014/0225410 A1*  8/2014 Thurow ................. B60N 2/22
                                                       297/359

FOREIGN PATENT DOCUMENTS

| JP | 2000-066753 | 3/2000 |
| JP | 2002-264680 | 9/2002 |
| JP | 2004-224238 | 8/2004 |
| JP | 2015-040038 | 3/2015 |
| JP | 2016-168972 | 9/2016 |

OTHER PUBLICATIONS

Japanese Office Action for Japanese Patent Application No. 2017-195198 dated Mar. 5, 2019.
Japanese Office Action for Japanese Patent Application No. 2017-195198 dated May 21, 2019.

* cited by examiner

STEERING DEVICE

CROSS-REFERENCE TO RELATED APPLICATION

Priority is claimed on Japanese Patent Application No. 2017-195198, filed Oct. 5, 2017, the content of which is incorporated herein by reference.

BACKGROUND OF THE INVENTION

Field of the Invention

The present invention relates to a steering device.

Description of Related Art

In the past, steering devices have been used to perform a change operation of a steering angle of a vehicle. Such a steering device is, for instance, a steering device (a steering system) disclosed in Japanese Unexamined Patent Application, First Publication No. 2016-168972.

The steering device of Japanese Unexamined Patent Application, First Publication No. 2016-168972 is installed in a vehicle that can switch between automatic driving and manual driving. During the manual driving, the steering device is disposed at a position suitable for driving (a position suitable for the change operation of the steering angle). When a driving state of the vehicle is changed from the manual driving to the automatic driving, the steering device moves from the position suitable for driving to a position at which a relaxed posture can be assumed.

SUMMARY OF THE INVENTION

However, the steering device of Japanese Unexamined Patent Application, First Publication No. 2016-168972 is disposed in front of a driver during both the automatic driving and the manual driving. For this reason, when the driver relaxes by leaning back against a seat during the automatic driving, and then the driving state of the vehicle is changed from the automatic driving to the manual driving, the driver has to get up to grasp the steering device. Therefore, it is difficult to promptly grasp the steering device and to react instantly to the manual driving. Thus, steering devices that enable the driver to react instantly to manual driving when the driving state of a vehicle is changed from automatic driving to manual driving and has excellent operability during manual driving are being studied.

The present invention was made in view of such conventional problems, and is directed to providing a steering device which enables a sitter to instantly respond to a situation in which a driving state of a vehicle is changed from automatic driving to manual driving and has excellent operability during manual driving.

According to a first aspect of the present invention, a steering device includes: a pair of armrests which are mounted on left and right sides of a seat for a vehicle and are formed to be movable in a forward and backward direction of the seat, and on which arms of a sitter are placed; and a pair of steering means which are provided on the pair of armrests, are formed to be grasped by the sitter in a state in which the arms of the sitter are placed on the pair of armrests, and are moved in the forward and backward direction to change a steering angle of the vehicle. The armrests are configured to move in the forward and backward direction in association with the movement of the steering means in the forward and backward direction.

According to a second aspect of the present invention, in the steering device according to the first aspect of the present invention, the steering means protrude from the armrests, and operating means for performing operations other than the change operation of the steering angle are provided on a tip surface of at least one of the pair of steering means.

According to a third aspect of the present invention, in the steering device according to the first or second aspect of the present invention, the seat includes a seat cushion, and a seat back that is connected to a rear end of the seat cushion to be tiltable with respect to the seat cushion. The steering device further comprises a pair of base members that support the armrests to be movable in the forward and backward direction, and the pair of base members include first supports that are supported by the seat cushion, and second supports that are supported by the seat back, and translate upper surfaces of the armrests with tilting of the seat back.

According to a fourth aspect of the present invention, the steering device according to any one of the first to third aspects of the present invention further includes regulating means for regulating movement of the pair of armrests in the forward and backward direction during automatic driving of the vehicle.

According to a fifth aspect of the present invention, the steering device according to any one of the first to fourth aspects of the present invention further includes interlocking means by which, when one of the pair of steering means is moved in the forward and backward direction by an operation of the sitter, the other of the pair of steering means is interlocked and moved in a direction that is opposite to a direction in which the one steering means moves and is one of the forward and backward directions.

In the first aspect, the pair of steering means formed to be able to be grasped by the sitter are provided on the pair of armrests. Thereby, the steering device is disposed at a position suitable for a change operation of a steering angle during both manual driving and automatic driving of the vehicle. For this reason, when the sitter relaxes by leaning back against the seat during the automatic driving and then a driving state of the vehicle is changed from the automatic driving to the manual driving, the sitter can promptly grasp the steering means without getting up. Therefore, the steering device enables the sitter to instantly cope with the situation in which the driving state of the vehicle is changed from the automatic driving to the manual driving.

Further, in the first aspect, as the steering means move in the forward and backward direction, the armrests are configured to move in the forward and backward direction. Thereby, the sitter can perform the change operation of the steering angle with his/her arms placed on the pair of armrests. Therefore, the sitter can perform the change operation of the steering angle in a state in which his/her arms are stable. Accordingly, the steering device having excellent steering operability during the manual driving can be provided.

In the second aspect, the operating means that perform operations other than the change operation of the steering angle are provided on at a tip surface of at least one of the pair of steering means. Thereby, the sitter can perform the operations other than the change operation of the steering angle in a state in which the sitter grasps the steering means. Accordingly, the steering device can improve operability of the operations other than the change operation of the steering angle.

In the third aspect, the steering device further includes the pair of base members that support the armrests to be movable in the forward and backward direction. The pair of base members are supported by the seat cushion and the seat back, and translate upper surfaces of the armrests with tilting of the seat back. Thereby, inclinations of the upper surfaces of the armrests are inhibited from being changed in association with the tilting of the seat back. Therefore, even when the seat back is in a reclined state, the upper surfaces of the pair of armrests can be maintained, for instance, in a horizontal state, and thus the sitter can place his/her arms on the pair of armrests in a stable state. Accordingly, the steering device can prevent deterioration of the operability of the steering means regardless of a tilting angle of the seat back.

In the fourth aspect, the steering device includes the regulating means that regulate the movement of the pair of armrests in the forward and backward direction during the automatic driving of the vehicle. Thereby, during the automatic driving, positions of the pair of steering means are fixed via the pair of armrests by the regulating means. For this reason, when the sitter or another occupant erroneously operates the pair of steering means during the automatic driving, the change operation of the steering angle of the vehicle can be prevented from being performed by the pair of steering means.

In the fifth aspect, the steering device includes the interlocking means by which, when one of the pair of steering means is moved in the forward and backward direction by an operation of the sitter, the other of the pair of steering means is interlocked and moved in the direction that is opposite to the direction in which the one steering means moves and is one of the forward and backward directions. Thereby, when the sitter only operates one of the steering means, the change operation of the steering angle is possible. Accordingly, the steering device can further improve the operability during the manual driving.

DETAILED DESCRIPTION OF THE INVENTION

Next, an embodiment of the present invention will be described on the basis of the drawings.

Figure 1:
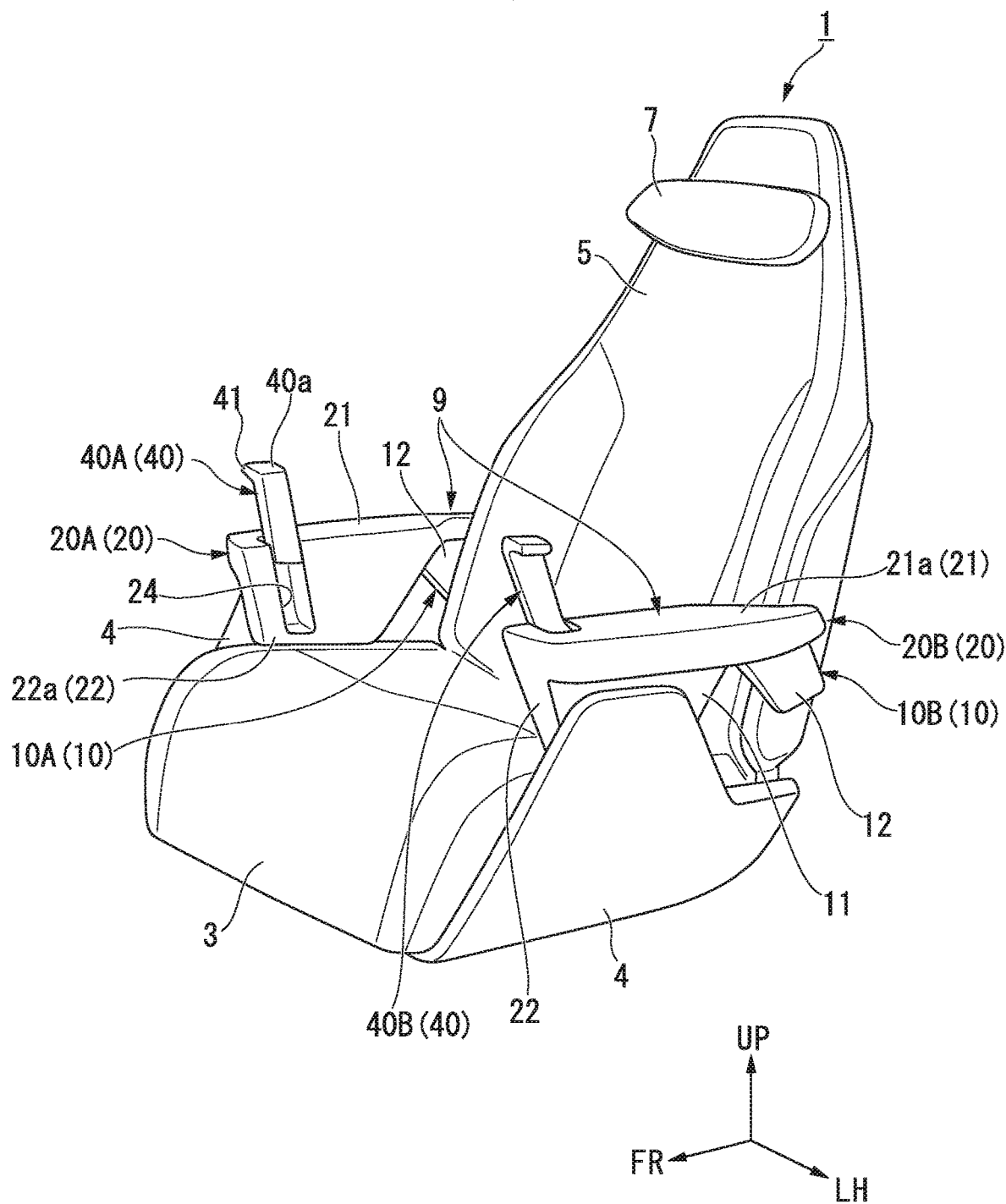
FIG. 1 is a perspective view of a seat having a steering device of an embodiment.

FIG. 1 is a perspective view of a seat 1 having a steering device 9 of an embodiment.

As shown in FIG. 1, the seat 1 of the embodiment is a seat for a vehicle. The seat 1 is mounted, for instance, in a vehicle in which a driving mode can be switched between an automatic driving mode and a manual driving mode. In automatic driving, the vehicle determines the situation of itself and its surroundings to perform driving. In manual driving, that a driver A (see FIG. 9) drives a vehicle. The seat 1 is a seat in which the driver sits.

The seat 1 includes a seat cushion 3 that supports the buttocks of the driver A, a seat back 5 that is connected to a rear end of the seat cushion 3 and supports the waist and back of the driver A, a headrest 7 that is connected to an upper portion of the seat back 5 and supports the neck and head of the driver A, and the steering device 9 that is used for a change operation of a steering angle of the vehicle. In the following description, directions of front, rear, up, down, left, and right are the same as directions of front, rear, up, down, left, and right in the seat 1. In the drawings, an arrow UP indicates an upper side, an arrow FR indicates a front side, an arrow LH indicates a left side. A leftward and rightward direction is identical to a width direction of the seat 1. A forward and backward direction is identical to a forward and backward direction of the vehicle.

The seat cushion 3 includes a frame that forms a skeleton, a pad that is formed of, for instance, a urethane foam and is mounted on the frame, and a cover that is formed of, for instance, a synthetic fiber or leather and covers the frame and the pad. A pair of side supports 4 are provided at both left and right ends of the seat cushion 3. The pair of side supports 4 protrudes upward from both the left and right ends of the seat cushion 3.

The seat back 5 is connected to a rear end of the seat cushion 3 to be tiltable in the forward and backward direction. Like the seat cushion 3, the seat back 5 includes a frame, a pad, and a cover. For example, like the seat cushion 3 and the seat back 5, the headrest 7 includes a frame, a pad, and a cover.

Figure 2:
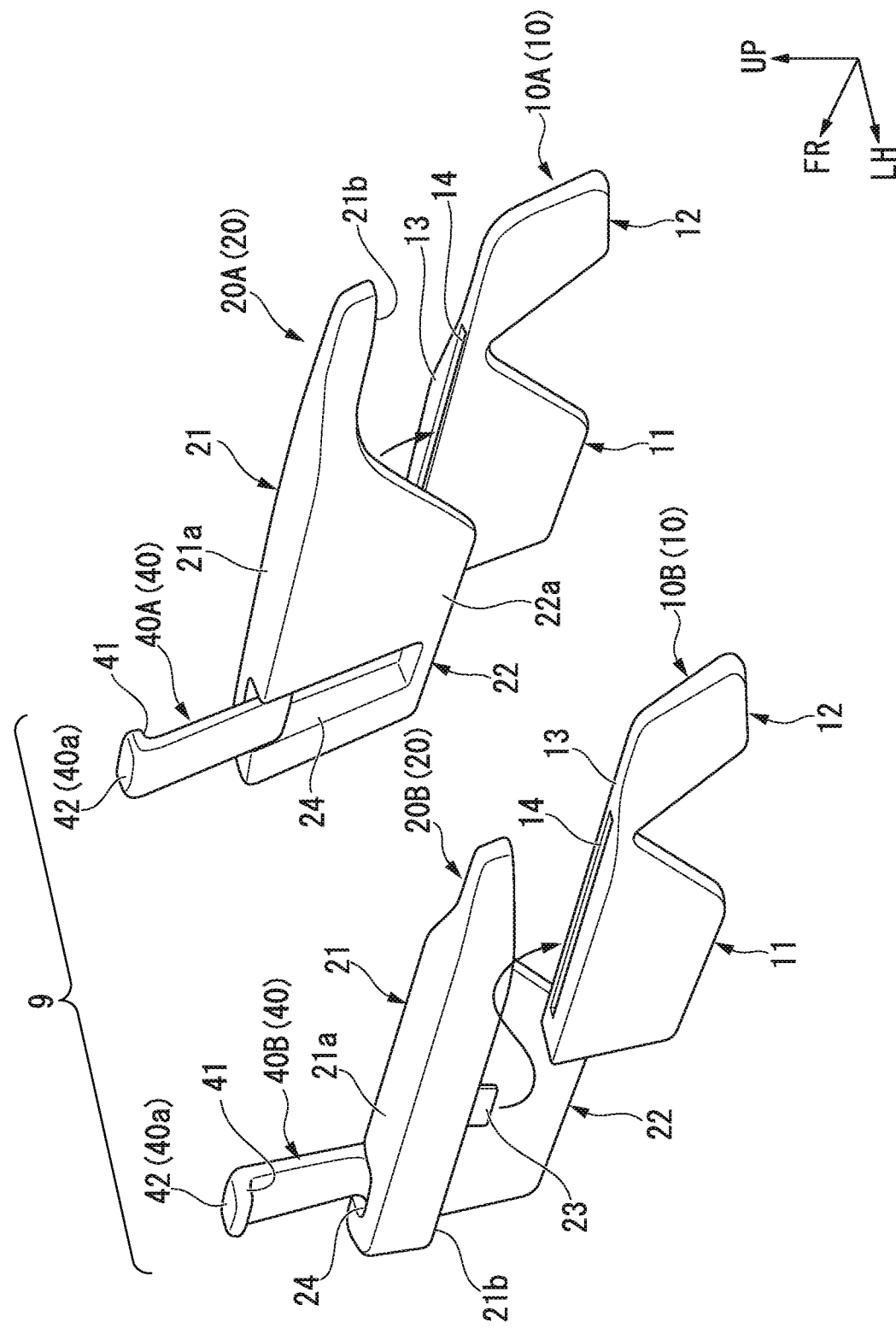
FIG. 2 is an exploded perspective view of the steering device of the embodiment.

FIG. 2 is an exploded perspective view of the steering device 9.

As shown in FIG. 2, the steering device 9 includes a pair of base members 10A and 10B, a pair of armrests 20A and 20B, and a pair of steering levers (steering means) 40A and 40B. Sensors, which detect operation amounts or presence/absence of operations of the steering levers 40A and 40B, are mounted in the steering device 9. Results detected by the sensors are output to, for instance, a steering system. The steering system includes, for instance, a steering ECU and an electric motor. For example, the electric motor applies a force to a rack and pinion mechanism, and changes directions of front wheels (steered wheels) of the vehicle. For example, the steering ECU drives the electric motor according to information input from the steering device 9, and changes the directions of the front wheels.

The pair of base members 10A and 10B are provided on left and right sides of the seat 1 (both left and right sides of the seat cushion 3 and the seat back 5) (see FIG. 1). That is, the pair of base members 10A and 10B are provided to sandwich the sitter of the seat 1 from both the left and right sides. The pair of base members 10A and 10B are a right base member 10A provided on the right side of the seat 1, and a left base member 10B provided on the left side of the seat 1. The pair of base members 10A and 10B are supported by the seat cushion 3 and the seat back 5 via supporting means 50 (see FIG. 6). A constitution of the supporting means 50 will be described below. Each of the base members 10A and 10B includes a first support 11 and a second support 12. Hereinafter, when the base members 10A and 10B are not differentiated from each other, they are simply indicated as base members 10.

The first supports 11 form front portions of the base members 10. The first supports 11 are supported by the side supports 4 (see FIG. 1). Grooves 14 are provided in upper surfaces 13 of the first supports 11. The grooves 14 extend in the forward and backward direction. Front ends of the second supports 12 are coupled to rear ends of the first supports 11. The second supports 12 form rear portions of the base members 10. The second supports 12 are supported by lateral portions of the seat back 5 in the leftward and rightward direction (see FIG. 1). Upper surfaces 13 of the second supports 12 are formed to be flush with the upper surfaces 13 of the first supports 11.

Both arms B (see FIG. 9) of the driver A are placed on the pair of armrests 20A and 20B. The pair of armrests 20A and 20B are a right armrest 20A provided on the right side of the seat 1, and a left armrest 20B provided on the left side of the seat 1. The right armrest 20A is supported by the right base member 10A to be movable in the forward and backward direction. The left armrest 20B is supported by the left base member 10B to be movable in the forward and backward direction. Thereby, the pair of armrests 20A and 20B are mounted on the left and right sides of the seat 1 to be movable in the forward and backward direction. Hereinafter, when the armrests 20A and 20B are not differentiated from each other, they are simply indicated as armrests 20.

Each of the armrests 20 includes a top wall part 21 and a sidewall part 22. For example, the top wall part 21 and the sidewall part 22 are integrally formed.

The top wall parts 21 are provided at upper portions of the armrests 20. The top wall parts 21 extend in the forward and backward direction. The forearms of the driver A are placed on upper surfaces 21a of the top wall parts 21. The top wall parts 21 are supported by the upper surfaces 13 of the base members 10 to be movable (slidable) in the forward and backward direction. At an initial position, front ends of the top wall parts 21 are disposed at the same positions in the forward and backward direction as front ends of the base members 10. The initial position is a position in a state in which the change operation of the steering angle is not performed (in a straight-ahead steering state).

Locking parts 23 protrude downward from lower surfaces 21b of the top wall parts 21. In a state in which the lower surfaces 21b of the top wall parts 21 are supported on the upper surfaces 13 of the base members 10 to be movable in the forward and backward direction, the locking parts 23 are disposed in the grooves 14 of the base members 10. The locking parts 23 are formed to be movable in the grooves 14 in the forward and backward direction. The locking parts 23 are formed to be locked to front ends of the grooves 14 when the top wall parts 21 move forward from the initial position by a predetermined amount. The locking parts 23 are formed to be locked to rear ends of the grooves 14 when the top wall parts 21 move backward by a predetermined amount. Thereby, the locking parts 23 regulate movement ranges of the armrests 20 in the forward and backward direction.

The sidewall parts 22 extend downward from the top wall parts 21. The sidewall parts 22 are connected from front ends to middle portions of the top wall parts 21. The sidewall parts 22 are provided around a seating space of the seat 1 with respect to the base members 10. Thereby, each of the sidewall parts 22 is disposed between the sitter in the seat 1 and the corresponding base member 10. Lateral surfaces 22a, which face the seating space of the seat 1 and extend in the forward and backward direction and an upward and downward direction, are formed at the sidewall parts 22.

Storage parts 24 are provided at front portions of the armrests 20. The steering levers 40A and 40B are slidably stored in the storage parts 24. The storage parts 24 are formed at the sidewall parts 22 in groove shapes. The storage parts 24 are inclined with respect to the upward and downward direction to be directed forward and upward from below and extend in a linear shape. Upper ends of the storage parts 24 are open on the upper surfaces 21a of the top wall part 21. Lengths of the storage parts 24 are nearly identical to those of the steering levers 40A and 40B.

The pair of steering levers 40A and 40B are provided on the armrests 20. The pair of steering levers 40A and 40B are a right steering lever 40A provided on the right armrest 20A and a left steering lever 40B provided on the left armrest 20B. The pair of steering levers 40A and 40B are moved in the forward and backward direction by an operation (a pushing/pulling operation) of the driver A. The pair of steering levers 40A and 40B are moved in the forward and backward direction, thereby changing the steering angle of the vehicle. Hereinafter, when the steering levers 40A and 40B are not differentiated from each other, they are simply indicated as steering levers 40.

Figure 9:
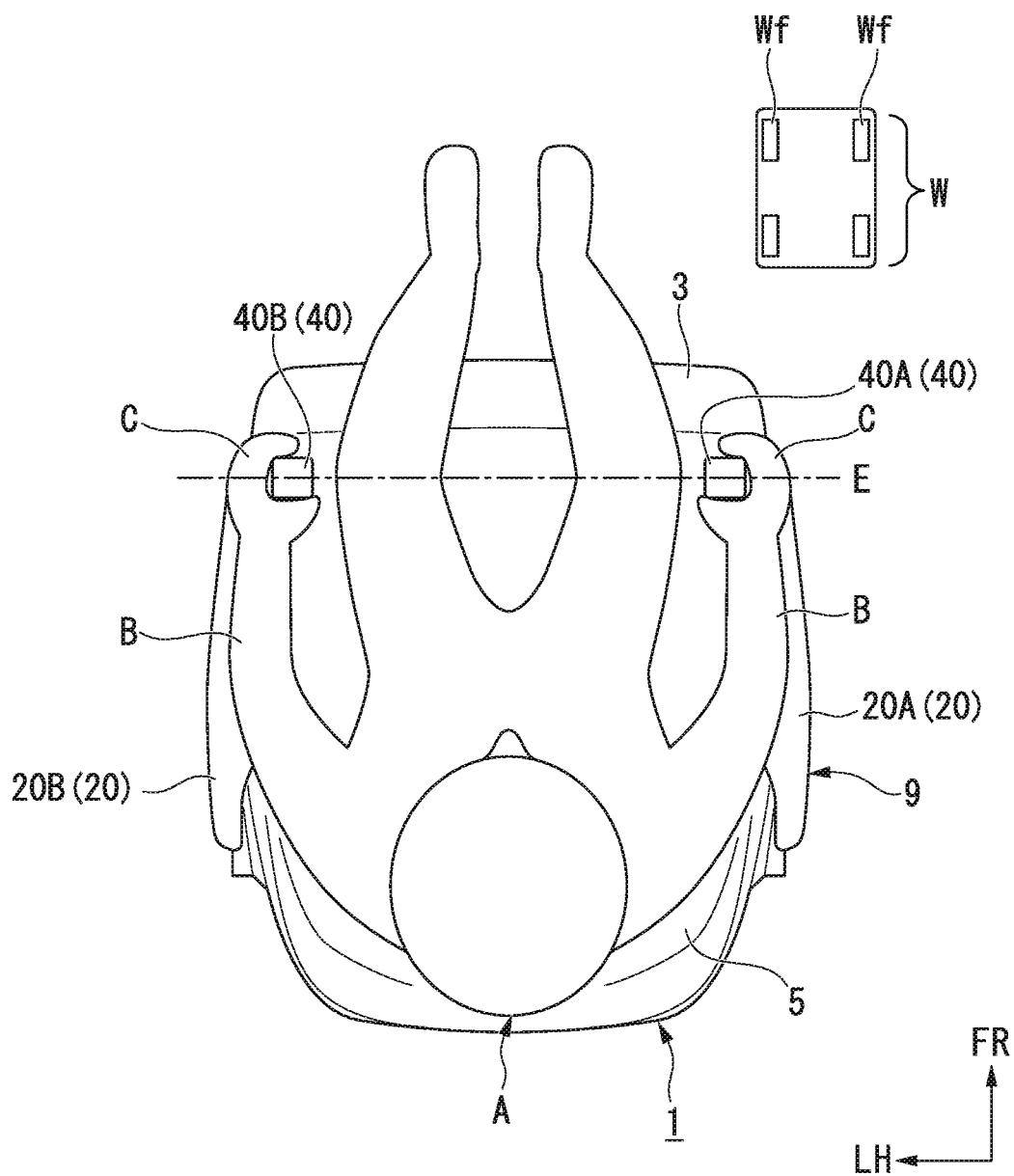
FIG. 9 is a view showing a relationship between steering levers and wheels that are disposed at the initial position in the embodiment.

The steering levers 40 are provided to be able to be grasped by the hands C of the driver A in a state in which the forearms of the driver A are placed on the armrests 20 (see FIG. 9). Each of the steering levers 40 is formed in a bar shape. The steering levers 40 are mounted to be able to be stored in the storage parts 24 of the armrests 20. Thereby, as the steering levers 40 move in the forward and backward direction, the armrests 20 move in the forward and backward direction. Lower portions of the steering levers 40 are disposed in the storage parts 24 of the armrests 20, and upper portions of the steering levers 40 are disposed above the storage parts 24. That is, the lower portions of the steering levers 40 are disposed in front portions of the armrests 20, and the upper portions of the steering levers 40 protrude upward from the front portions of the armrests 20. Thereby, the steering levers 40 are configured to be able to be grasped by the hands C of the driver A in a state in which the forearms of the driver A are placed on portions other than front portions on the upper surfaces 21a of the top wall parts 21 of the armrests 20.

An upper end 41 of each of the steering levers 40 is bent toward the outside of the seat 1 in the leftward and rightward direction. An operating means 42 is provided on an upper end face (a tip surface) 40a of each of the steering levers 40. The operating means 42 performs operations other than the change operation of the steering angle. The operations other than the change operation of the steering angle are, for instance, operations of a navigation device, an audio device, and so on. The operating means 42 includes, for instance, a trackpad, a switch, and so on.

Figure 4:
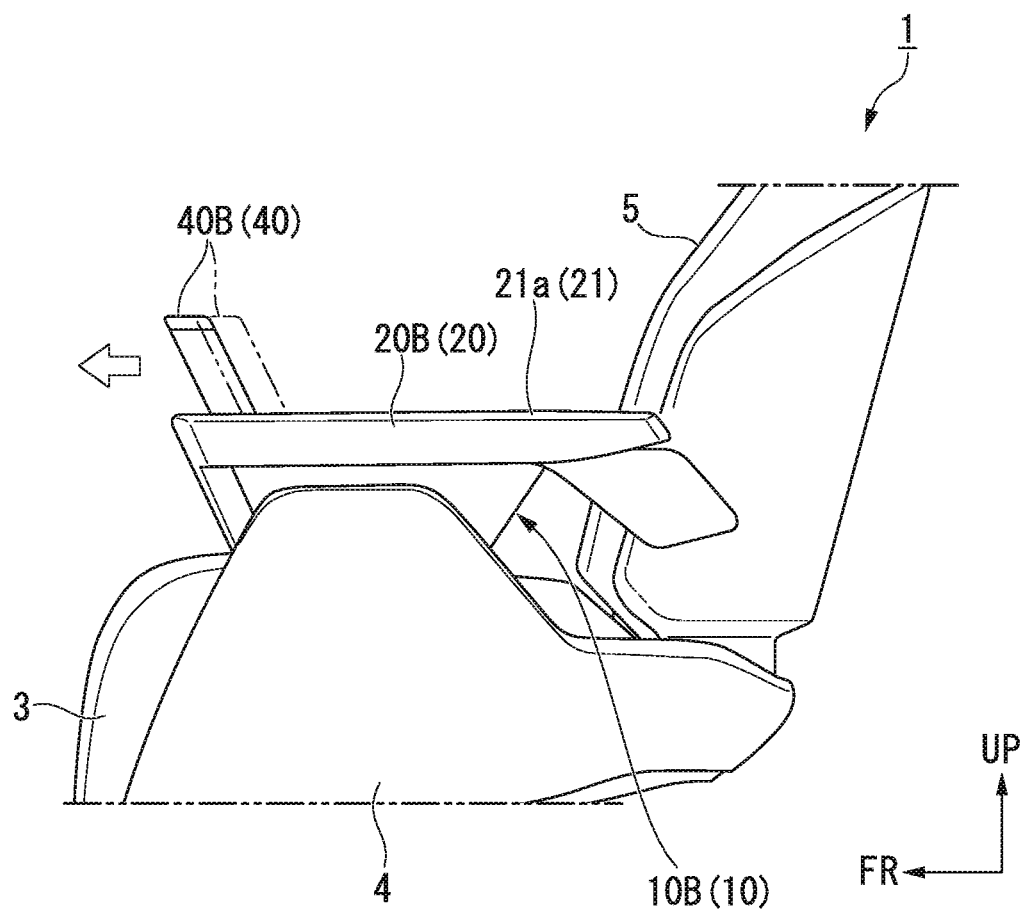
FIG. 4 is a view showing a state in which the left steering lever moves forward from the initial position.
Figure 5:
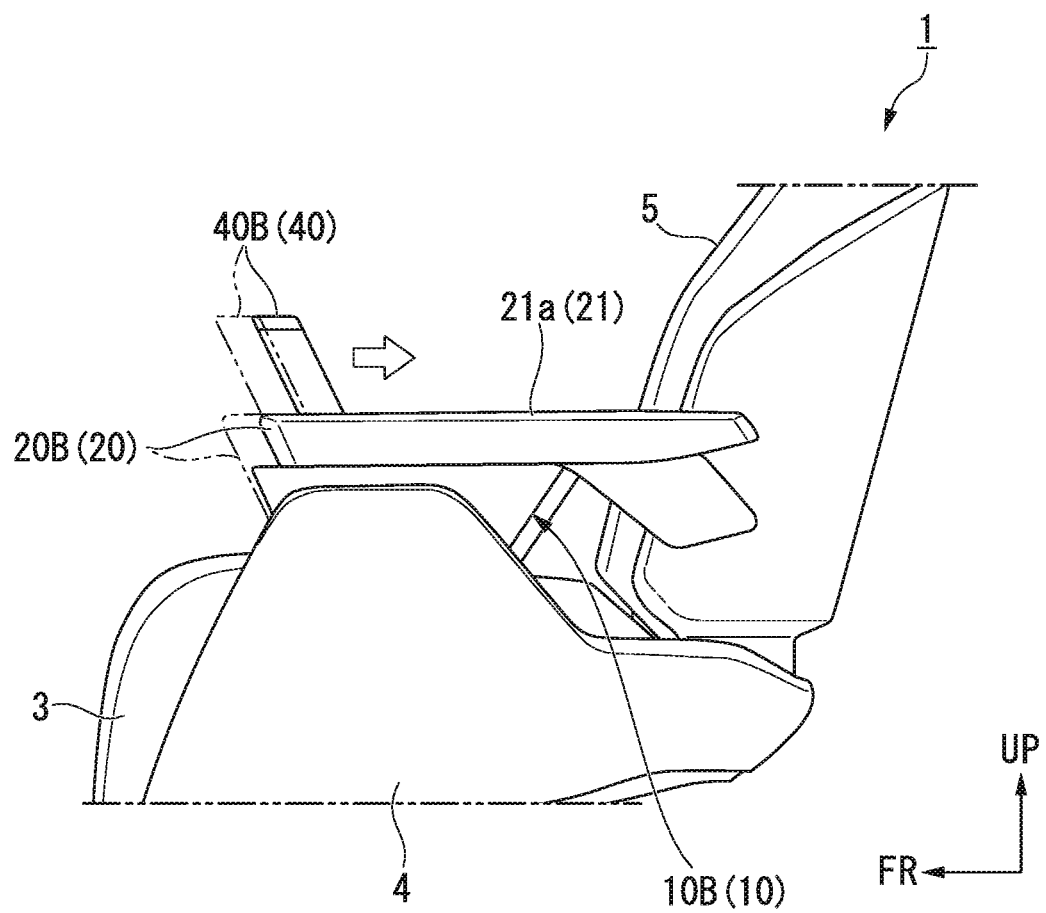
FIG. 5 is a view showing a state in which the left steering lever moves backward from the initial position.

Next, as to the movement of the armrests 20 associated with the movement of the steering levers 40, movement of the left armrest 20B and movement of the steering lever 40B will be described by way of example using FIGS. 3 to 5.

Figure 3:
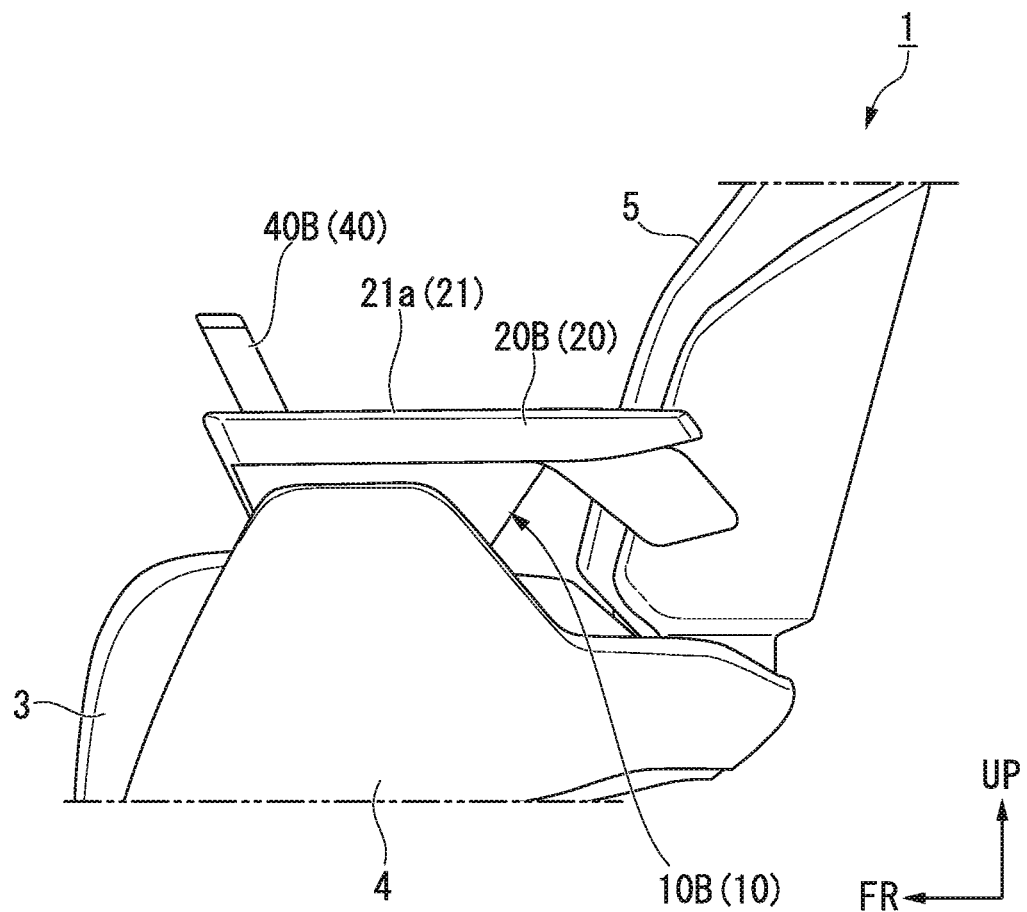
FIG. 3 is a view showing a state in which a left steering lever is disposed at an initial position.

FIG. 3 is a view showing a state in which the left steering lever 40B is disposed at an initial position. FIG. 4 is a view showing a state in which the left steering lever 40B moves forward from the initial position. FIG. 5 is a view showing a state in which the left steering lever 40B moves backward from the initial position.

As shown in FIG. 3, when the steering levers 40 are disposed at an initial position, front ends of the armrests 20 are disposed at the same positions as front ends of the base members 10 in the forward and backward direction. As described above, the armrests 20 are supported on the upper surfaces 13 of the base members 10 (see FIG. 2) to be movable in the forward and backward direction. The steering levers 40 are mounted on the armrests 20. Thus, the armrests 20 and the steering levers 40 move together (move in the forward and backward direction). Therefore, as shown in FIGS. 3 and 4, when the steering levers 40 move forward from the initial position by a predetermined amount, the upper surfaces 21a of the top wall parts 21 of the armrests 20 move forward from the initial position by a predetermined amount. As shown in FIGS. 3 and 5, when the steering levers 40 move backward from the initial position by a predetermined amount, the upper surfaces 21a of the top wall parts 21 of the armrests 20 move backward from the initial position by a predetermined amount.

Figure 6:
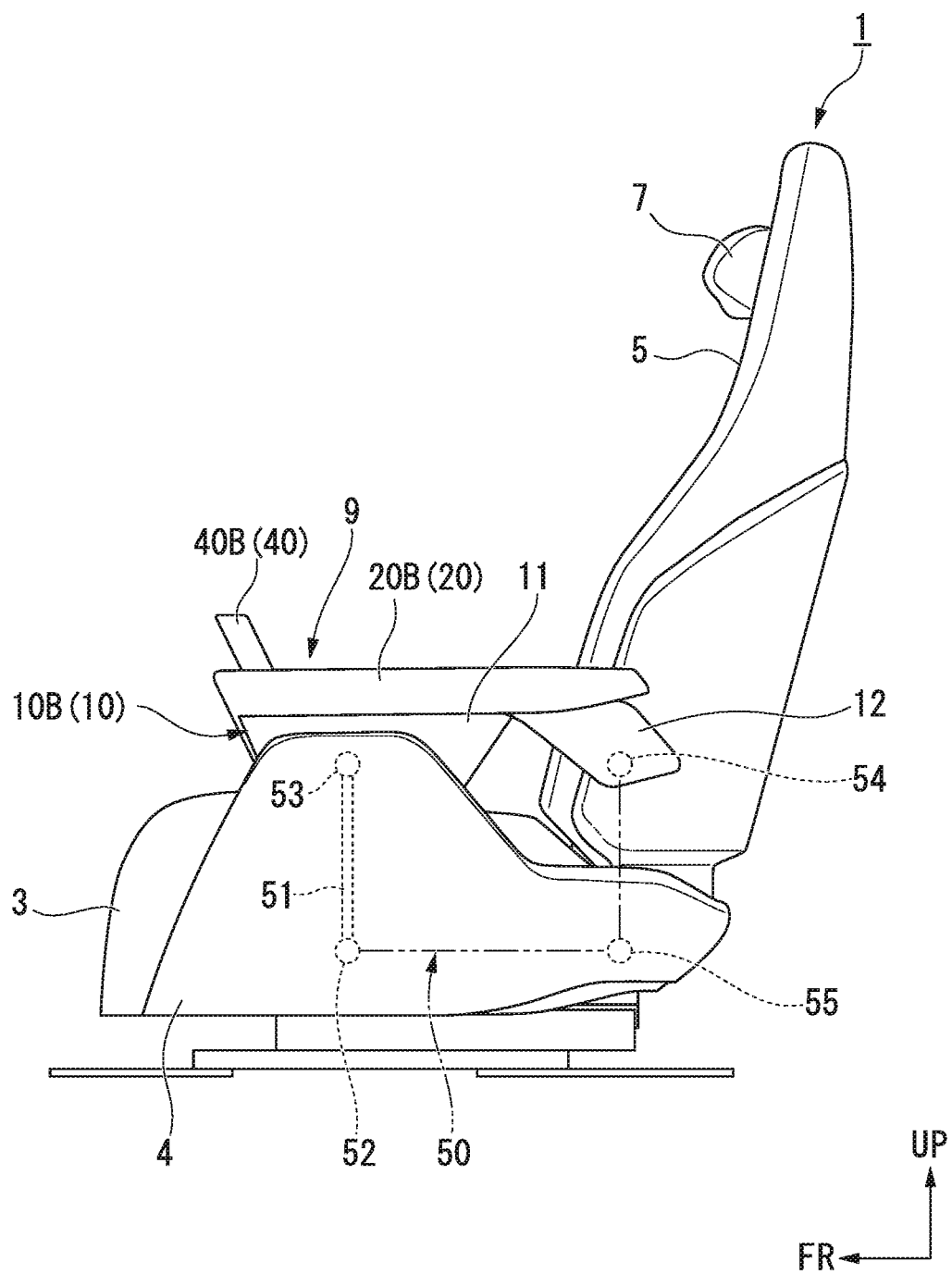
FIG. 6 is a left side view of a seat of the embodiment.
Figure 7:
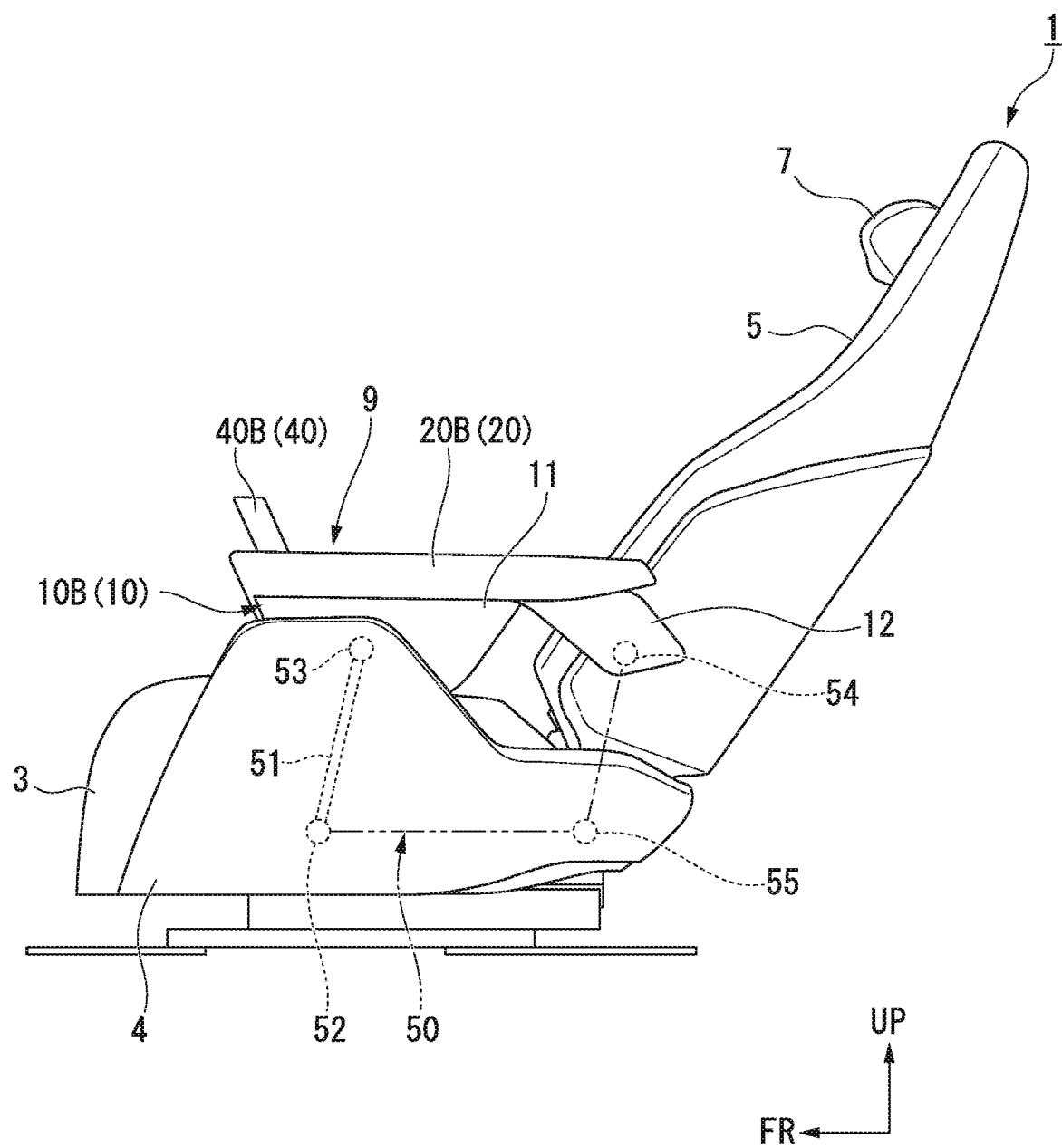
FIG. 7 is a left side view of the seat of the embodiment.

FIGS. 6 and 7 are left side views of the seat 1. FIG. 7 shows a state in which the seat back 5 is reclined with respect to a state shown in FIG. 6.

As shown in FIG. 6, the steering device 9 includes supporting means 50. The supporting means 50 are provided on left and right sides of the seat cushion 3 and the seat back 5. In FIGS. 6 and 7, only the left supporting means 50 is shown. The supporting means 50 support the base members 10 of the steering device 9 with respect to the seat cushion 3 and the seat back 5. The supporting means 50 are parallel link mechanisms that translate the base members 10 of the steering device 9 relative to the seat cushion 3.

For example, the supporting means 50 are the parallel link mechanisms made up of the seat cushion 3, the seat back 5, the base members 10 of the steering device 9, and link members 51. The link members 51 are members that link the seat cushion 3 and the base members 10. The link members 51 are rotatably linked to the frame of the seat cushion 3 at linking points 52. The link members 51 are rotatably linked to the first supports 11 of the base members 10 at linking points 53. The aforementioned linking points 52 and 53, the linking points 54 for the second supports 12 of the base members 10 and the seat back 5, and the linking points 55 for the seat cushion 3 and the seat back 5 are provided to be located at the apexes of a parallelogram when viewed in the leftward and rightward direction. Thereby, as shown in FIGS. 6 and 7, the supporting means 50 constitute parallel link mechanisms that translate the base members 10 and the armrests 20 relative to the seat cushion 3.

The supporting means 50 translate the base members 10 of the steering device 9 in the backward direction with the backward movement (tilting) of the seat back 5. The supporting means 50 translate the base members 10 of the steering device 9 in the forward direction with the forward movement (tilting) of the seat back 5.

Figure 8:
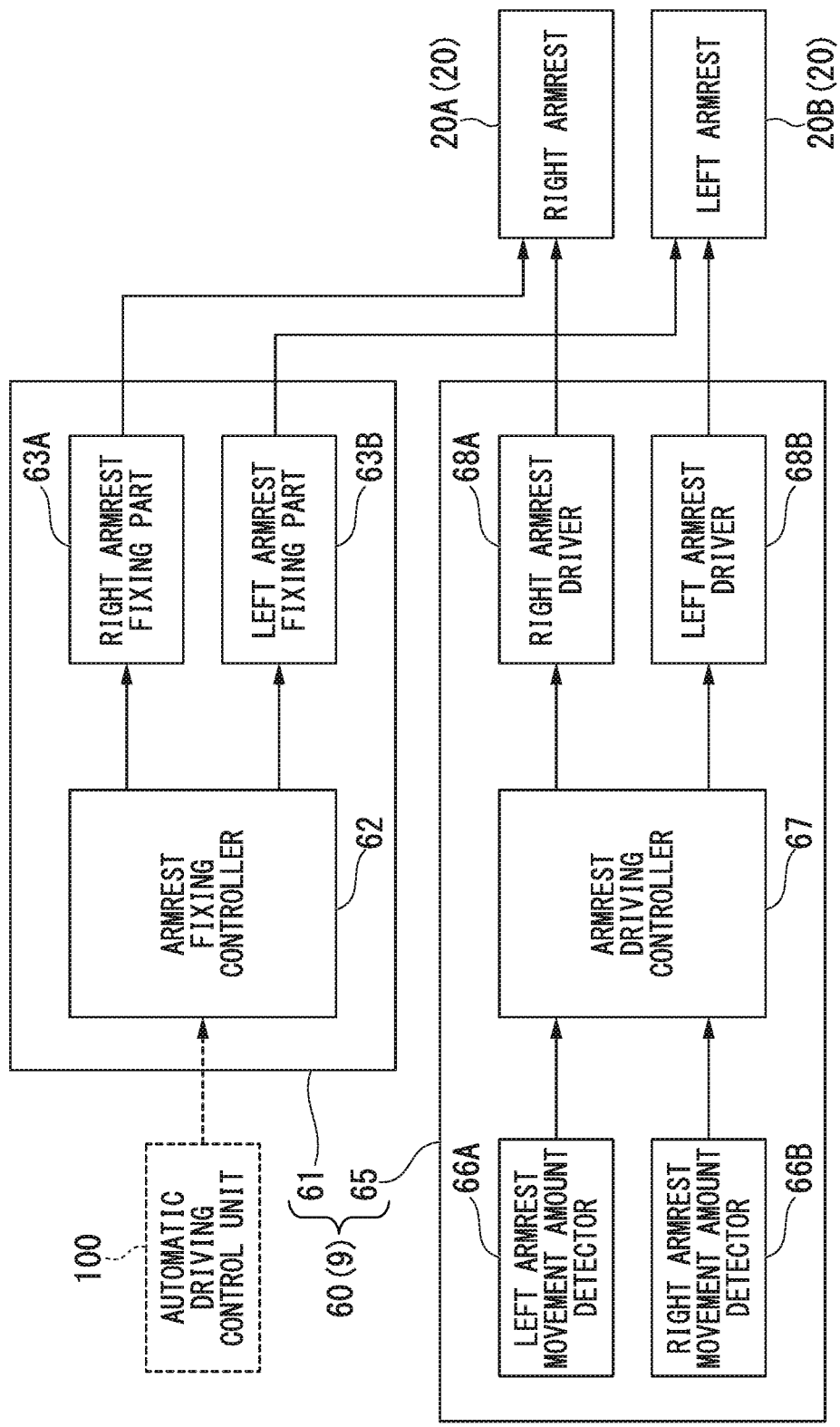
FIG. 8 is a block diagram of a control device of the steering device of the embodiment.

FIG. 8 is a block diagram of a control device 60 of the steering device 9.

As shown in FIG. 8, the steering device 9 further includes a control device 60. The control device 60 controls the right armrest 20A and the left armrest 20B. The control device 60 includes a regulating means 61 and an interlocking means 65.

The regulating means 61 fixes positions of the pair of armrests 20A and 20B during the automatic driving of the vehicle. That is, the regulating means 61 regulates movement of the pair of armrests 20A and 20B in the forward and backward direction during the automatic driving of the vehicle. The regulating means 61 includes an armrest fixing controller 62, a right armrest fixing part 63A, and a left armrest fixing part 63B.

An output side of an automatic driving control unit 100 is connected to an input side of the armrest fixing controller 62. Input sides of the right armrest fixing part 63A and the left armrest fixing part 63B are connected to an output side of the armrest fixing controller 62.

The automatic driving control unit 100 is installed in the vehicle. The automatic driving control unit 100 performs switching between the automatic driving and the manual driving. The automatic driving control unit 100 controls the automatic driving during the automatic driving. The automatic driving control unit 100 outputs the driving state (the driving mode) of the vehicle as a driving mode signal. The driving state of the vehicle refers to the automatic driving (the automatic driving mode) and the manual driving (the manual driving mode).

The armrest fixing controller 62 determines whether the driving state of the vehicle is the automatic driving or the manual driving on the basis of a driving mode signal output from the automatic driving control unit 100. When it is determined that the driving state of the vehicle is the automatic driving, that is, when the driving state of the vehicle is switched from the manual driving to the automatic driving, the armrest fixing controller 62 outputs a right armrest fixing signal to the right armrest fixing part 63A, and outputs a left armrest fixing signal to the left armrest fixing part 63B. The right armrest fixing signal is a signal for fixing a position of the right armrest 20A. The left armrest fixing signal is a signal for fixing a position of the left armrest 20B.

For example, the right armrest fixing part 63A is provided on the right base member 10A. The right armrest fixing part 63A is driven when the right armrest fixing signal is output from the armrest fixing controller 62, and fixes the position of the right armrest 20A. For example, the left armrest fixing part 63B is provided on the left base member 10B. The left armrest fixing part 63B is driven when the left armrest fixing signal is output from the armrest fixing controller 62, and fixes the position of the left armrest 20B.

The regulating means 61 unfixes the pair of armrests 20A and 20B during the manual driving of the vehicle. That is, the regulating means 61 releases movement regulation of the pair of armrests 20A and 20B in the forward and backward direction during the manual driving of the vehicle. When it is determined on the basis of the driving mode signal output from the automatic driving control unit 100 that the driving state of the vehicle is the manual driving, that is, when the driving state of the vehicle is switched from the automatic driving to the manual driving, the armrest fixing controller 62 outputs a right armrest unfixing signal to the right armrest fixing part 63A, and outputs a left armrest unfixing signal to the left armrest fixing part 63B. The right armrest unfixing signal is a signal for unfixing the right armrest 20A. The left armrest unfixing signal is a signal for unfixing the left armrest 20B.

The right armrest fixing part 63A is driven when the right armrest unfixing signal is output from the armrest fixing controller 62, and unfixes the right armrest 20A. The left armrest fixing part 63B is driven when the left armrest unfixing signal is output from the armrest fixing controller 62, and unfixes the left armrest 20B.

When one of the pair of steering levers 40A and 40B moves in the forward and backward direction due to an operation of the driver A, the interlocking means 65 interlocks the other of the pair of steering levers 40A and 40B to move the one steering lever 40 located in the forward and backward direction in a direction opposite to a direction in which the one steering lever 40 moves. To be specific, when one of the pair of steering levers 40A and 40B moves in one of the forward and backward directions, the interlocking means 65 moves the other of the pair of steering levers 40A and 40B in the other of the forward and backward directions, for instance, by the same distance as the one steering lever 40. Further, when the movement of the steering levers 40A and 40B caused by the operation of the driver A is completed, the interlocking means 65 moves the pair of steering levers 40A and 40B to return to the initial position. Hereinafter, the content of this will be described in detail.

The interlocking means 65 includes a left armrest movement amount detector 66A, a right armrest movement amount detector 66B, an armrest driving controller 67, a right armrest driver 68A, and a left armrest driver 68B. The right armrest driver 68A and the left armrest driver 68B are, for instance, driving sources such as motors, and are disposed, for instance, inside the base members 10.

The left armrest movement amount detector 66A is provided, for instance, on the left armrest 20B. The left armrest movement amount detector 66A detects a movement amount of the left armrest 20B. That is, the left armrest movement amount detector 66A detects a movement amount of the left steering lever 40B. The movement amount of the left armrest 20B is a movement amount by which the left armrest 20B moves from the initial position (the position in the state in which the change operation of the steering angle is not performed) in the forward and backward direction. The left armrest movement amount detector 66A outputs the detected movement amount of the left armrest 20B as a left armrest movement amount detection signal.

The right armrest movement amount detector 66B is provided, for instance, on the right armrest 20A. The right armrest movement amount detector 66B detects a movement amount of the right armrest 20A. That is, the right armrest movement amount detector 66B detects a movement amount of the right steering lever 40A. The movement amount of the right armrest 20A is a movement amount by which the right armrest 20A moves from the initial position in the forward and backward direction. The right armrest movement amount detector 66B outputs the detected movement amount of the right armrest 20A as a right armrest movement amount detection signal.

An input side of the armrest driving controller 67 is connected to an output side of the left armrest movement amount detector 66A and an output side of the right armrest movement amount detector 66B. An output side of the armrest driving controller 67 is connected to an input side of the right armrest driver 68A and an input side of the left armrest driver 68B. When the left armrest movement amount detection signal is output from the left armrest movement amount detector 66A, the armrest driving controller 67 acquires the movement amount of the left armrest 20B on the basis of the left armrest movement amount detection signal. The armrest driving controller 67 outputs a right armrest driving signal to the right armrest driver 68A on the basis of the acquired movement amount of the left armrest 20B. The right armrest driving signal is a signal for displacing the right armrest 20A from the initial position in a direction that is opposite to a direction in which the left armrest 20B moves and is one of the forward and backward directions by the movement amount of the left armrest 20B.

When the right armrest movement amount detection signal is output from the right armrest movement amount detector 66B, the armrest driving controller 67 acquires the movement amount of the right armrest 20A on the basis of the right armrest movement amount detection signal. The armrest driving controller 67 outputs a left armrest driving signal to the left armrest driver 68B on the basis of the acquired movement amount of the right armrest 20A. The left armrest driving signal is a signal for displacing the left armrest 20B from the initial position in a direction that is opposite to a direction in which the right armrest 20A moves and is one of the forward and backward directions by the movement amount of the right armrest 20A.

The right armrest 20A is connected to an output side of the right armrest driver 68A. When the right armrest driving signal is output from the armrest driving controller 67, the right armrest driver 68A disposes the right armrest 20A at a position that is moved from the initial position by the movement amount of the left armrest 20B in the direction that is opposite to the direction in which the left armrest 20B moves and is one of the forward and backward directions. Consequently, the right steering lever 40A is also disposed at a position that is moved from the initial position by the movement amount of the left steering lever 40B in a direction that is opposite to a direction in which the left steering lever 40B moves and is one of the forward and backward directions.

The left armrest 20B is connected to an output side of the left armrest driver 68B. When the left armrest driving signal is output from the armrest driving controller 67, the left armrest driver 68B disposes the left armrest 20B at a position that is moved from the initial position by the movement amount of the right armrest 20A in the direction that is opposite to the direction in which the right armrest 20A moves and is one of the forward and backward directions. Consequently, the left steering lever 40B is also disposed at a position that is moved from the initial position by the movement amount of the right steering lever 40A in a direction that is opposite to a direction in which the right steering lever 40A moves and is one of the forward and backward directions.

When it is determined on the basis of at least one of the left armrest movement amount detection signal and the right armrest movement amount detection signal that steering operations of the pair of armrests 20A and 20B caused by the driver A are stopped, the armrest driving controller 67 outputs a right armrest return signal to the right armrest driver 68A, and outputs a left armrest return signal to the left armrest driver 68B. The right armrest return signal is a signal for returning the right armrest 20A to the initial position. The left armrest return signal is a signal for returning the left armrest 20B to the initial position. When the right armrest return signal is output from the armrest driving controller 67, the right armrest driver 68A is driven to return the right armrest 20A to the initial position. Consequently, the right steering lever 40A also returns to the initial position. When the left armrest return signal is output from the armrest driving controller 67, the left armrest driver 68B is driven to return the left armrest 20B to the initial position. Consequently, the left steering lever 40B also returns to the initial position. Thereby, like a vehicle in which a steering wheel is mounted, a steering reaction force equivalent to self-aligning torque can be reproduced.

When the pair of armrests 20A and 20B are returned to the initial position, driving forces of the right armrest driver 68A and the left armrest driver 68B are such as to be set to be able to regulate displacement of the right steering lever 40A and the left steering lever 40B in the forward and backward direction by the driver A. The driving forces of the right armrest driver 68A and the left armrest driver 68B may be set to vary depending on distances (i.e., a magnitude of the steering angle) of the right steering lever 40A of the left steering lever 40B from the initial position.

Next, operations of the steering angles of the steering levers 40 using the interlocking means 65 will be described.

FIG. 9 is a view showing a relationship between the pair of steering levers 40A and 40B and wheels W disposed at an initial position E.

As shown in FIG. 9, in a state in which the pair of steering levers 40A and 40B are disposed at the initial position E, front wheels Wf are directed forward because an operation of the steering angle is not performed.

Figure 10:
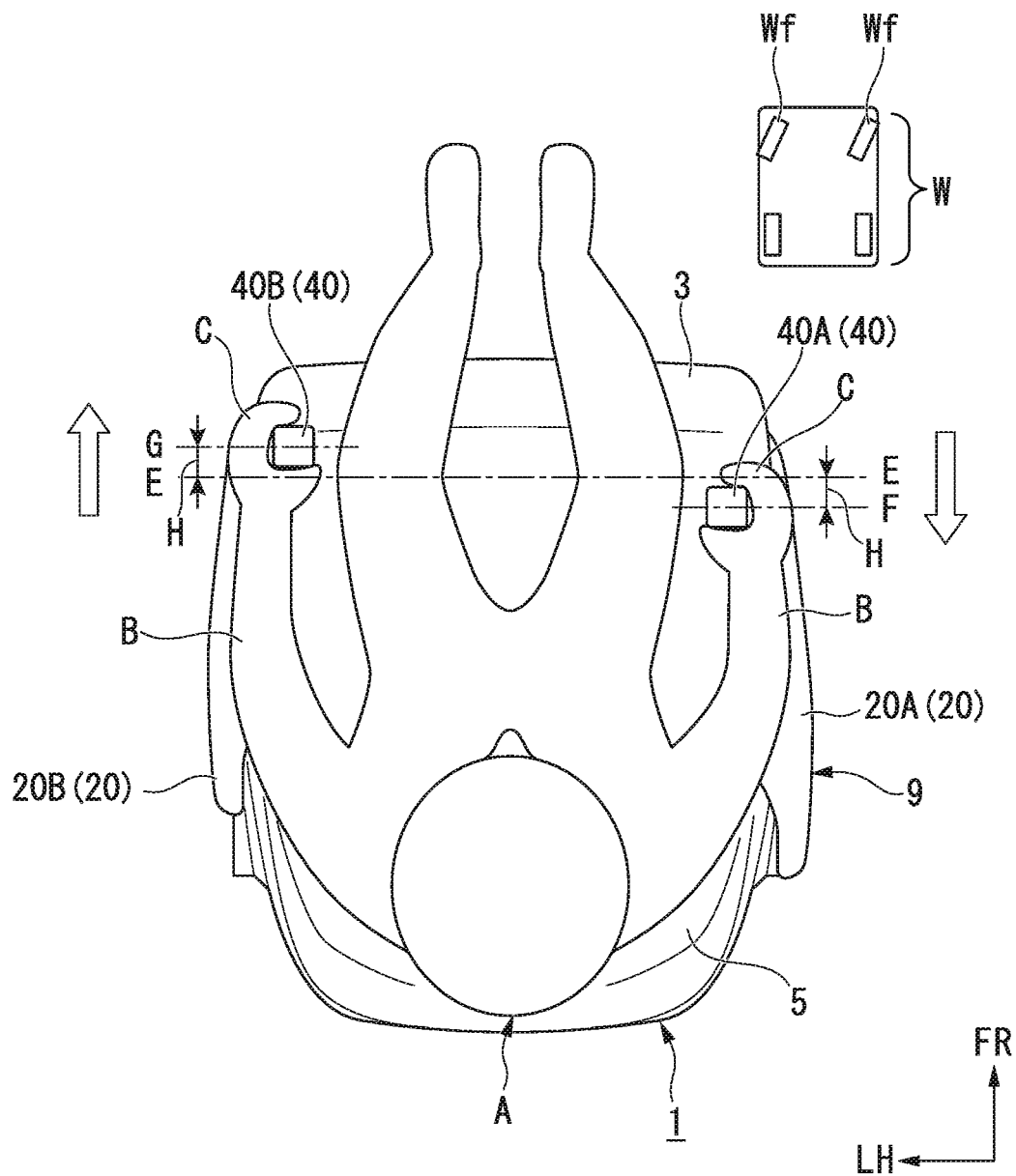
FIG. 10 is a view showing a relationship between steering levers and wheels at the time of rightward turning in the embodiment.

FIG. 10 is a view showing a relationship between the pair of steering levers 40A and 40B and the wheels W at the time of rightward turning.

As shown in FIG. 10, at the time of rightward turning, the right steering lever 40A is moved from an initial position E to a predetermined position F in the backward direction, and the left steering lever 40B is moved from the initial position E to a predetermined position G in the forward direction. There are two methods for displacing the right steering lever 40A and the left steering lever 40B. One method is a method using the operation of the right steering lever 40A. The other method is a method using the operation of the left steering lever 40B. Hereinafter, the two methods will be described in detail.

(1) Method Using the Operation of the Right Steering Lever 40A

As shown in FIGS. 9 and 10, when the driver A pulls the right steering lever 40A and moves it from the initial position E to the predetermined position F in the backward direction, the left steering lever 40B is interlocked by the interlocking means 65, and is moved from the initial position E to the predetermined position G in the forward direction, so that front wheels Wf are directed rightward.

The interlocking of the left steering lever 40B caused by the operation of the right steering lever 40A will be described using FIG. 8. When the driver A moves the right steering lever 40A from the initial position E to the predetermined position F in the backward direction, the right armrest movement amount detector 66B detects a movement amount H of the right armrest 20A, and outputs a right armrest movement amount detection signal. The armrest driving controller 67 outputs a left armrest driving signal on the basis of the right armrest movement amount detection signal. The left armrest driver 68B moves the left armrest 20B from the initial position E in the forward direction by the movement amount H of the right armrest 20A on the basis of the left armrest driving signal, and disposes the left armrest 20B at the predetermined position G. Consequently, the left steering lever 40B is also moved from the initial position E in the forward direction by the movement amount H of the right armrest 20A, and is disposed at the predetermined position G.

(2) Method Using the Operation of the Left Steering Lever 40B

As shown in FIGS. 9 and 10, when the driver A pushes the left steering lever 40B and moves it from the initial position E to the predetermined position G in the forward direction, the right steering lever 40A is interlocked by the interlocking means 65, and is moved from the initial position E to the predetermined position F in the backward direction, so that the front wheels Wf are directed rightward.

The interlocking of the right steering lever 40A caused by the operation of the left steering lever 40B will be described using FIG. 8. When the driver A moves the left steering lever 40B from the initial position E to the predetermined position G in the forward direction, the left armrest movement amount detector 66A detects a movement amount H of the left armrest 20B, and outputs a left armrest movement amount detection signal. The armrest driving controller 67 outputs a right armrest driving signal on the basis of the left armrest movement amount detection signal. The right armrest driver 68A moves the right armrest 20A from the initial position E in the backward direction by the movement amount H of the left armrest 20B on the basis of the right armrest driving signal, and disposes the right armrest 20A at the predetermined position F. Consequently, the right steering lever 40A is also moved from the initial position E in the backward direction by the movement amount H of the left armrest 20B, and is disposed at the predetermined position F.

At the time of rightward turning, both when the right steering lever 40A is operated and when the left steering lever 40B is operated, the pair of steering levers 40A and 40B are returned to the initial position E by the interlocking means 65 when the operation caused by the driver A is stopped. To be specific, when the movement of the pair of armrests 20A and 20B is stopped, the armrest driving controller 67 outputs a right armrest return signal and a left armrest return signal. The right armrest driver 68A drives the right armrest 20A to return from the predetermined position F to the initial position E on the basis of the right armrest return signal. Consequently, the right steering lever 40A also returns from the predetermined position F to the initial position E. The left armrest driver 68B drives the left armrest 20B to return from the predetermined position G to the initial position E on the basis of the left armrest return signal. Consequently, the left steering lever 40B also returns from the predetermined position G to the initial position E.

Figure 11:
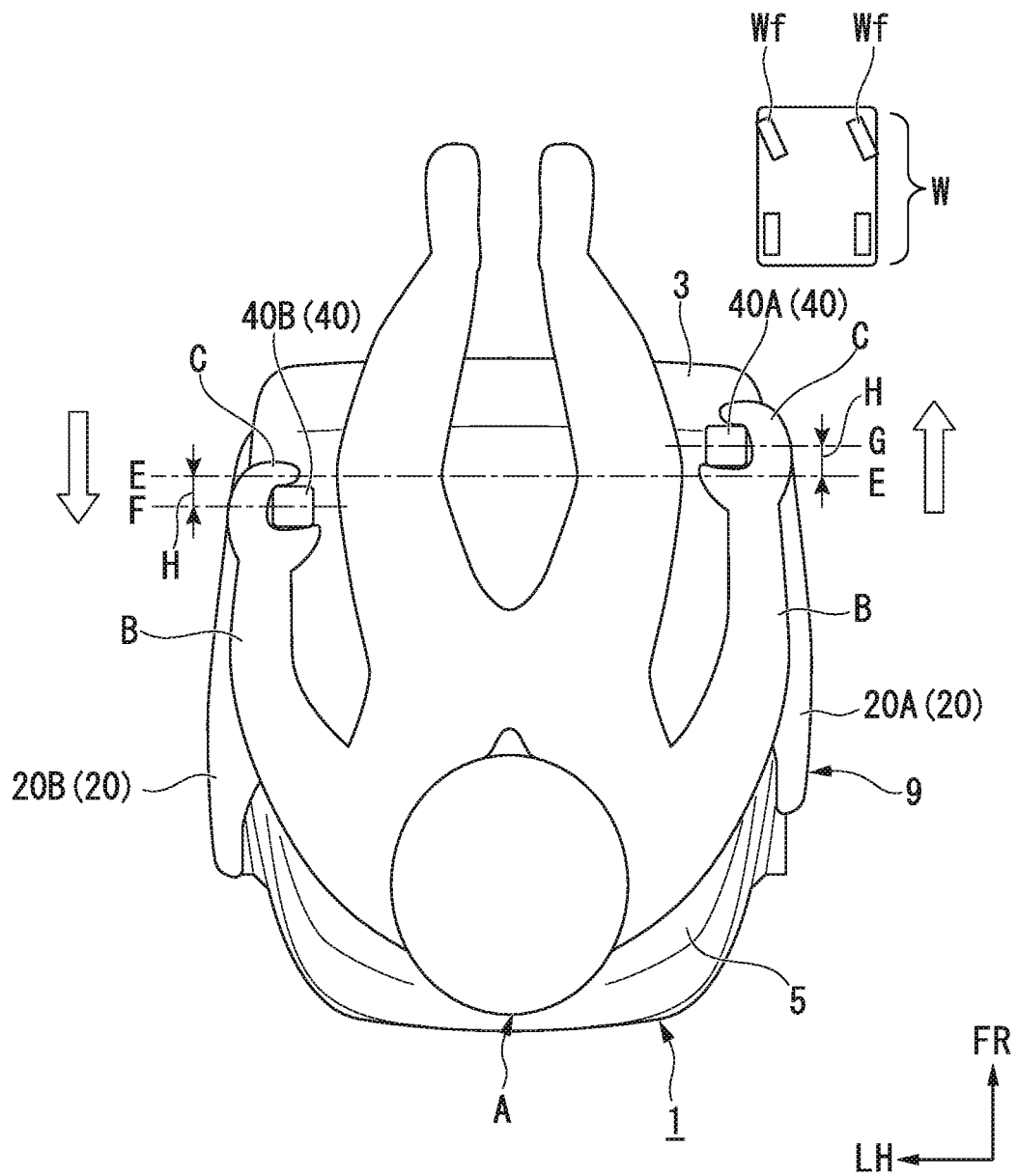
FIG. 11 is a view showing a relationship between steering levers and wheels at the time of leftward turning in the embodiment.

FIG. 11 is a view showing a relationship between the pair of steering levers 40A and 40B and the wheels W at the time of leftward turning.

As shown in FIG. 11, at the time of leftward turning, the right steering lever 40A is moved from an initial position E to the predetermined position F in the forward direction, and the left steering lever 40B is moved from the initial position E to the predetermined position F in the backward direction. There are two methods for displacing the right steering lever 40A and the left steering lever 40B. One method is a method using the operation of the right steering lever 40A. The other method is a method using the operation of the left steering lever 40B. Hereinafter, the two methods will be described in detail.

(1) Method using the operation of the right steering lever 40A As shown in FIGS. 9 and 11, when the driver A pushes the right steering lever 40A and moves it from the initial position E to the predetermined position G in the forward direction, the left steering lever 40B is interlocked by the interlocking means 65, and is moved from the initial position E to the predetermined position F in the backward direction, so that the front wheels Wf are directed leftward.

The interlocking of the left steering lever 40B caused by the operation of the right steering lever 40A will be described using FIG. 8. When the driver A moves the right steering lever 40A from the initial position E to the predetermined position G in the forward direction, the right armrest movement amount detector 66B detects a movement amount H of the right armrest 20A, and outputs a right armrest movement amount detection signal. The armrest driving controller 67 outputs a left armrest driving signal on the basis of the right armrest movement amount detection signal. The left armrest driver 68B moves the left armrest 20B from the initial position E in the backward direction by the movement amount H of the right armrest 20A on the basis of the left armrest driving signal, and disposes the left armrest 20B at the predetermined position F. Consequently, the left steering lever 40B is also moved from the initial position E in the backward direction by the movement amount H of the right armrest 20A, and is disposed at the predetermined position F.

(2) Method Using the Operation of the Left Steering Lever 40B

As shown in FIGS. 9 and 11, when the driver A pulls the left steering lever 40B and moves it from the initial position E to the predetermined position F in the backward direction, the right steering lever 40A is interlocked by the interlocking means 65, and is moved from the initial position E to the predetermined position G in the forward direction, so that the front wheels Wf are directed leftward.

The interlocking of the right steering lever 40A caused by the operation of the left steering lever 40B will be described using FIG. 8. When the driver A moves the left steering lever 40B from the initial position E to the predetermined position F in the backward direction, the left armrest movement amount detector 66A detects a movement amount H of the left armrest 20B, and outputs a left armrest movement amount detection signal. The armrest driving controller 67 outputs a right armrest driving signal on the basis of the left armrest movement amount detection signal. The right armrest driver 68A moves the right armrest 20A from the initial position E in the forward direction by the movement amount H of the left armrest 20B on the basis of the right armrest driving signal, and disposes the right armrest 20A at the predetermined position G. Consequently, the right steering lever 40A is also moved from the initial position E in the forward direction by the movement amount H of the left armrest 20B, and is disposed at the predetermined position G.

At the time of leftward turning, both when the right steering lever 40A is operated and when the left steering lever 40B is operated, the pair of steering levers 40A and 40B are returned to the initial position E by the interlocking means 65 when the operation caused by the driver A is stopped. To be specific, when the movement of the pair of armrests 20A and 20B is stopped, the armrest driving controller 67 outputs a right armrest return signal and a left armrest return signal. The right armrest driver 68A drives the right armrest 20A to return from the predetermined position G to the initial position E on the basis of the right armrest return signal. Consequently, the right steering lever 40A also returns from the predetermined position G to the initial position E. The left armrest driver 68B drives the left armrest 20B to return from the predetermined position F to the initial position E on the basis of the left armrest return signal. Consequently, the left steering lever 40B also returns from the predetermined position F to the initial position E.

Next, an operation and effects of the steering device 9 of the present embodiment will be described.

(1) In the steering device 9 of the present embodiment, the pair of steering levers 40A and 40B formed to be able to be grasped by the driver A are provided on the pair of armrests 20A and 20B. Thereby, the steering device 9 is disposed at a position suitable for the change operation of the steering angle during both the manual driving and the automatic driving of the vehicle. For this reason, while the driver A relaxes by leaning back against the seat 1 during the automatic driving, even when the driving state of the vehicle is switched from the automatic driving to the manual driving, the driver A can promptly grasp the steering levers 40A and 40B without getting up. Therefore, even when the driving state of the vehicle is changed from the automatic driving to the manual driving, the steering device 9 of the present embodiment enables the driver A to instantly cope with this situation.

Further, in the steering device 9 of the present embodiment, as the pair of steering levers 40A and 40B move in the forward and backward direction, the pair of armrests 20A and 20B move in the forward and backward direction. Thereby, the driver A can perform the change operation of the steering angle of the vehicle with his/her arms B placed on the pair of armrests 20A and 20B. Therefore, the driver A can perform the change operation of the steering angle of the vehicle in a state in which the arms B are stable. Accordingly, the steering device 9 having excellent steering operability during the manual drive can be provided. Further, in the steering device 9 of the present embodiment, the pair of armrests 20A and 20B themselves move in the forward and backward direction, the steering device 9 can also cope with a physique difference of the driver A. The physique difference of the driver A is, for instance, a difference in length of the arm due to a stature difference of the driver A.

(2) In the steering device 9 of the present embodiment, the operating means 42 that perform operations other than the change operation of the steering angle are provided on the upper surfaces of the pair of steering levers 40A and 40B. Thereby, the driver A can perform the operations other than the change operation of the steering angle in a state in which the driver A grasps the steering levers 40A and 40B. Accordingly, the steering device 9 of the present embodiment can improve operability of the operations other than the change operation of the steering angle.

(3) The steering device 9 of the present embodiment further includes the pair of base members 10A and 10B that support the armrests 20 to be movable in the forward and backward direction. The pair of base members 10A and 10B are supported by the seat cushion 3 and the seat back 5, and translate the upper surfaces 21a of the top wall parts 21 of the armrests 20 with the tilting of the seat back 5. Thereby, inclinations of the upper surfaces 21a of the top wall parts 21 of the pair of armrests 20A and 20B are inhibited from being changed with the tilting of the seat back 5. Therefore, even when the seat back 5 is in a reclined state, the driver A can maintain the upper surfaces 21a of the top wall parts 21 of the pair of armrests 20A and 20B in a horizontal state, and thus the driver A can place the arms B on the pair of armrests 20A and 20B in a stable state. Accordingly, the steering device 9 of the present embodiment can prevent deterioration of the operability of the steering levers 40A and 40B regardless of the tilting angle of the seat back 5.

(4) The steering device 9 of the present embodiment includes the regulating means 61 that regulates the movement of the pair of armrests 20A and 20B in the forward and backward direction during the automatic drive of the vehicle. Thereby, during the automatic drive, positions of the pair of steering levers 40A and 40B are fixed via the pair of armrests 20A and 20B by the regulating means 61. For this reason, when the driver or another occupant erroneously operates the pair of steering levers 40A and 40B during the automatic drive, the change operation of the steering angle of the vehicle can be prevented from being performed by the pair of steering levers 40A and 40B.

(5) The steering device 9 of the present embodiment includes the interlocking means 65 by which, when one of the pair of steering levers 40A and 40B is moved in the forward and backward direction by the operation of the driver A, the other of the pair of steering levers 40A and 40B is interlocked and moved in the direction that is opposite to the movement direction of the one steering lever 40 and is one of the forward and backward direction. Thereby, the driver A only operates one of the steering levers 40A and 40B, and the change operation of the steering angle is possible. The steering device 9 of the present embodiment can further improve the operability during the manual drive.

(6) In the steering device 9 of the present embodiment, when the movement of the pair of steering levers 40A and 40B is stopped, the pair of steering levers 40A and 40B are driven to return to the initial position E by the interlocking means 65. Thus, the driver A may not perform the operation of returning the pair of steering levers 40A and 40B to the initial position E. Accordingly, the steering device 9 of the present embodiment can further improve the operability during the manual drive.

The present invention is not limited to the above embodiment described with reference to the drawings, and various modifications are conceivable in the technical scope thereof.

For example, in the steering device 9 of the embodiment, the operating means 42 is provided on the pair of steering levers 40A and 40B, but the operating means 42 may be provided on only one of the pair of steering levers 40A and 40B.

The steering device 9 of the embodiment includes both the left armrest movement amount detector 66A and the right armrest movement amount detector 66B, but it may not necessarily include both. For example, the steering device 9 may include the left armrest movement amount detector 66A only, and include the right armrest movement amount detector 66B only.

In the embodiment, the constitution in which the steering device 9 is mounted in the vehicle that can be switched between the automatic drive and the manual drive has been given as an example, but the steering device may be mounted in a vehicle without an automatic drive function.

While the preferred embodiment of the present invention has been described, the present invention is not limited to the embodiment. Additions, omissions, substitutions, and other modifications of the constitution are possible without departing from the spirit of the present invention. The present invention is not limited by the above description, and is only limited by the appended claims.

What is claimed is:

1. A steering device comprising:
    a seat for a vehicle which has a seat cushion and a seat back that is connected to a rear end of the seat cushion to be tiltable with respect to the seat cushion;
    a pair of armrests which are mounted on left and right sides of the seat and are formed to be movable in a forward direction and a backward direction of the seat, and on which arms of a sitter can be placed;
    a pair of base members that support the pair of armrests to be movable in the forward direction and the backward direction;
    a pair of steering means which are provided on the pair of armrests, are formed to be grasped by the sitter in a state in which the arms of the sitter are placed on the pair of armrests, and are moved in the forward direction and the backward direction to change a steering angle of the vehicle; and
    supporting means that translate the pair of base members relative to the seat cushion with tilting of the seat back,
    wherein the pair of armrests are configured to move in the forward direction and the backward direction in association with movements of the pair of steering means in the forward direction and the backward direction.

2. The steering device according to claim 1, wherein:
    the pair of steering means protrude from the pair of armrests; and
    operating means for performing operations other than a change operation of the steering angle are provided on a tip surface of at least one of the pair of steering means.

3. The steering device according to claim 1, wherein:
    the pair of base members include first supports that are supported by the seat cushion, and second supports that are supported by the seat back, and translate upper surfaces of the pair of armrests with tilting of the seat back.

4. The steering device according to claim 1, further comprising regulating means for regulating movement of the pair of armrests in the forward direction and the backward direction during automatic driving of the vehicle.

5. The steering device according to claim 1, further comprising interlocking means by which, when one of the pair of steering means is moved in the forward direction and the backward direction by an operation of the sitter, the other of the pair of steering means is interlocked and moved in a direction that is opposite to another direction in which one steering means of the pair of steering means moves and is one of the forward direction and the backward direction.

6. The steering device according to claim 1, wherein:
    the supporting means link the pair of base members and each of the seat cushion and the seat back.

7. The steering device according to claim 6, wherein:
    the supporting means are link mechanisms.

8. The steering device according to claim 1, wherein:
    the supporting means have storage parts that slidably store the pair of steering means.

9. The steering device according to claim 1, further comprising a pair of side supports which protrude upward from both left and right ends of the seat cushion,
    wherein the pair of base members are supported by the pair of side supports.

* * * * *